United States Patent [19]

Bivens

[11] 4,028,766

[45] June 14, 1977

[54] DOUBLE OVERHEAD BRUSH ASSEMBLY

[75] Inventor: David J. Bivens, Danville, Va.

[73] Assignee: Bivens Winchester Corporation, Danville, Va.

[22] Filed: Mar. 11, 1976

[21] Appl. No.: 666,123

[52] U.S. Cl. .......................... 15/53 AB; 15/DIG. 2
[51] Int. Cl.² ........................................ B60S 13/06
[58] Field of Search .......... 15/53 A, 53 AB, DIG. 2

[56] References Cited

UNITED STATES PATENTS

| | | | |
|---|---|---|---|
| 2,610,342 | 9/1952 | Griffiths | 15/DIG. 2 |
| 2,879,529 | 3/1959 | Piper | 15/53 A |
| 2,881,459 | 4/1959 | Emanuel | 15/53 AB |
| 3,060,473 | 10/1962 | Vani | 15/53 AB |

FOREIGN PATENTS OR APPLICATIONS

| | | | |
|---|---|---|---|
| 793,756 | 4/1958 | United Kingdom | 15/DIG. 2 |
| 1,146,222 | 3/1969 | United Kingdom | 15/DIG. 2 |

Primary Examiner—Edward L. Roberts
Attorney, Agent, or Firm—Thomas N. Young

[57] ABSTRACT

A machine for washing vehicles such as large trucks and tractor-trailer combinations includes a triangular frame at each side of the path of the vehicle during the washing operation. Brushes rotatable about horizontal axes wash the front, top and rear of the vehicle. A first brush is mounted to be pushed upwardly by the front end of the vehicle as it moves through the apparatus and a second brush moves downwardly under its own weight in contact with the rear end of the vehicle. These brushes also engage the top of the vehicle. The first brush may be raised to clear exhaust stacks and the like, and the second brush is retained at an elevated position until the vehicle enters the apparatus sufficiently for it to be lowered onto the top. When the second brush reaches the lower end of its track after the vehicle departs, it is restored to the elevated position. The first brush is lifted from the top of the vehicle before it reaches the rear end of the vehicle, and is returned to its lowermost position after completion of the washing cycle.

11 Claims, 9 Drawing Figures

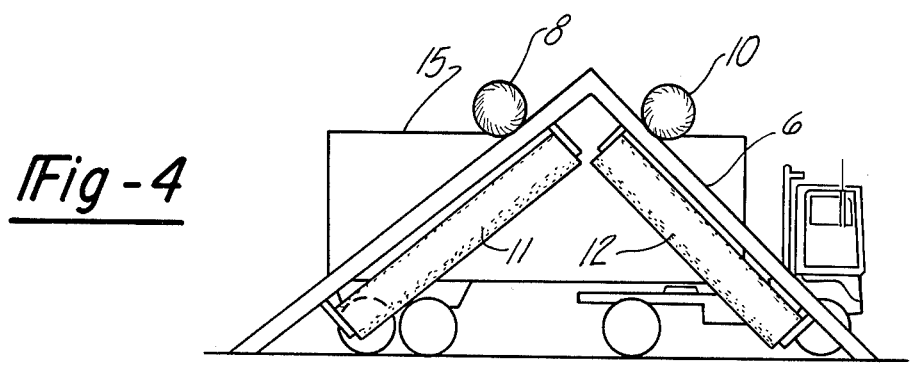
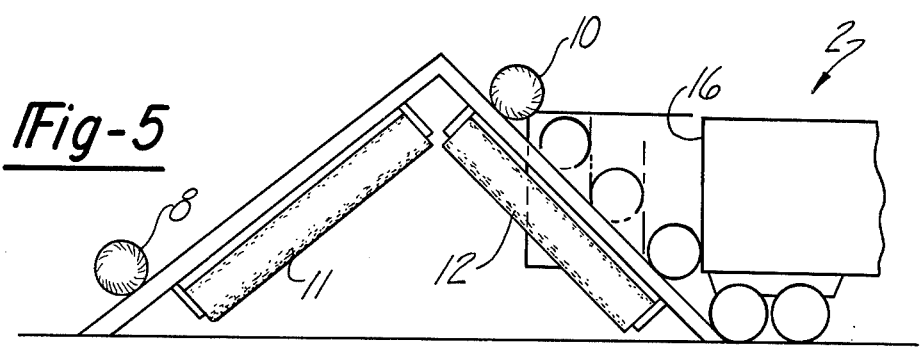
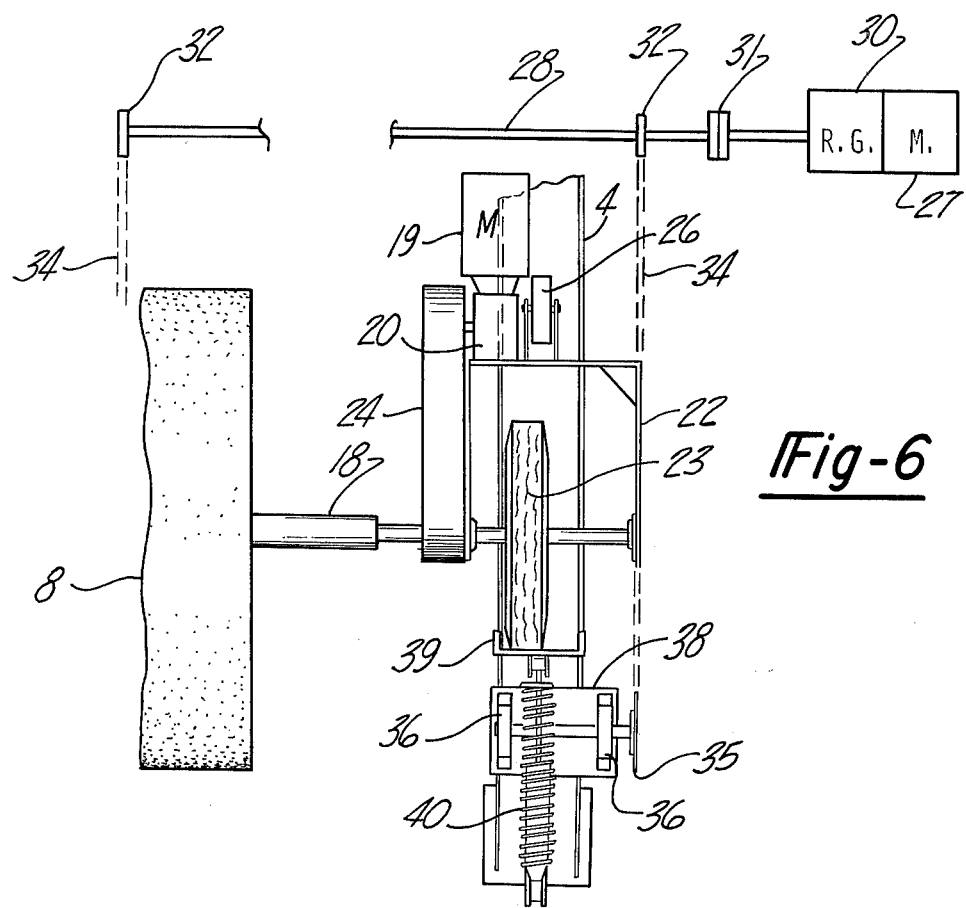

DOUBLE OVERHEAD BRUSH ASSEMBLY

My invention is directed to automatic or semiautomatic washing machines for vehicles. It is particularly intended for, and the preferred embodiment herein disclosed is adapted for, washing of large vehicles such as tractor-trailer combinations for highway use. However, the principles of the invention are applicable to other types of motor vehicles and to other vehicles such as railway cars, for example.

In the preferred embodiment the washing machine includes two brushes mounted on axes transverse to the direction of movement of the vehicle and mounted to traverse inclined tracks so that one brush is pushed upwardly on its track by the front end of the vehicle as it moves through the machine and the second brush is allowed to move downwardly on its track in contact with the rear end of the vehicle. Both brushes preferably engage the top surface of the vehicle. Preferably, the machine is stationary and the vehicle is driven or pulled through it. However, the washing apparatus could be mounted on a track and be moved past a stationary vehicle.

The principal object of the invention is to provide a simple, reliable, relatively inexpensive vehicle washing machine of superior performance.

The nature of my invention and its advantages will be clear to those skilled in the art from the suceeding detailed description of the preferred embodiment of the invention and the accompanying drawings.

FIGS. 2, 3, 4 and 5 are more or less diagrammatic views illustrating successive stages of the washing operation.

FIG. 6 is an illustration of a brush driving and traversing mechanism.

DETAILED DESCRIPTION OF THE PREFERRED EMBODIMENT

Figure 1:
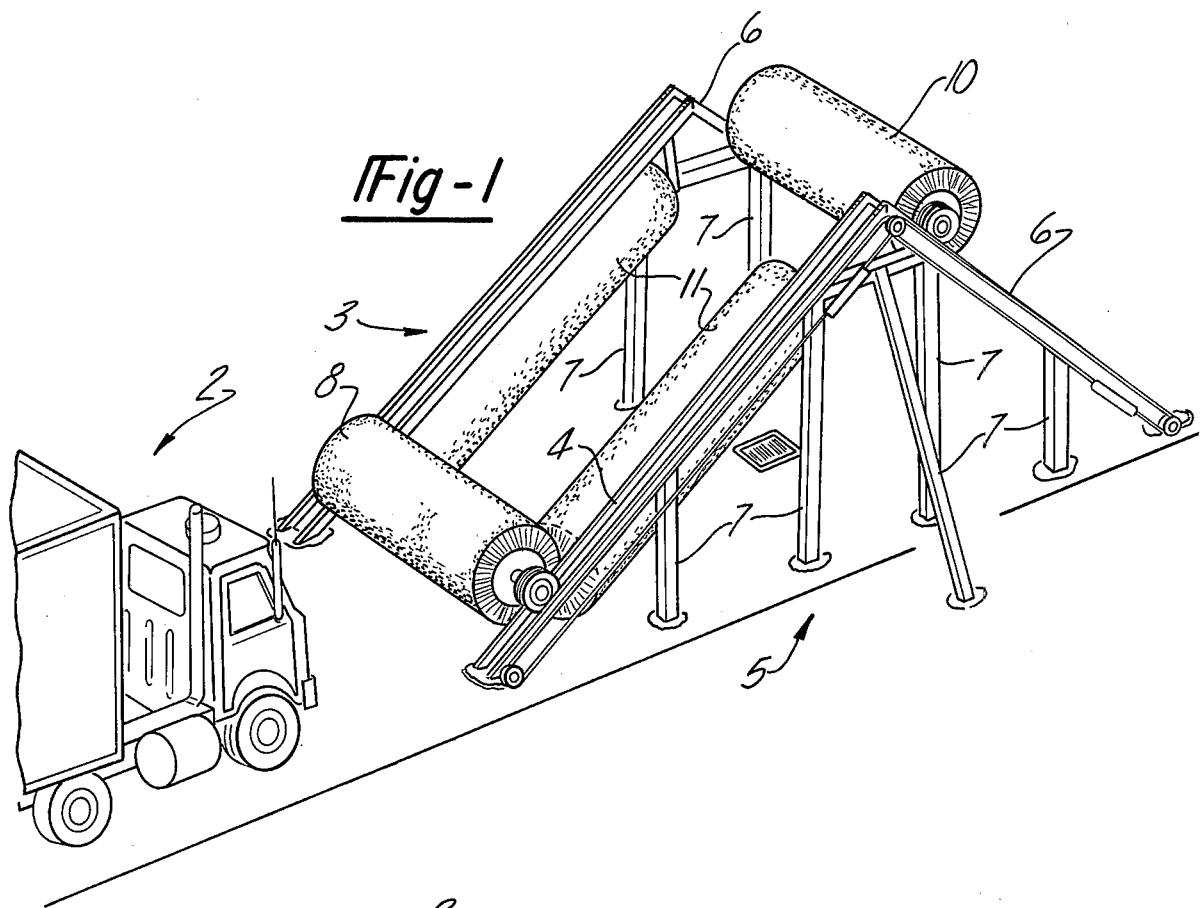
FIG. 1 is an isometric view of the apparatus showing a vehicle approaching the machine.

Referring first to FIG. 1, a vehicle 2, specifically a tractor and semitrailer combination, is shown entering a washing apparatus 3 according to the invention. The washing machine comprises a fixed framework 5 including parallel tracks or guide means 4 extending upwardly from near ground level on each side of the path of the vehicle through the machine and parallel tracks 6 extending downwardly from the upper end of tracks 4 to near ground level, each pair of tracks 4 and 6 thus defining the upper sides of a triangle, the lower surface of which is the pavement on which the vehicle travels. Tracks 4 and 6 are preferably I-beams with their flanges vertical, and are supported and held in place by suitable structural members 7 which may follow customary practice in the structural fabricating art. I consider than an angle of 40° between the tracks and the pavement is most suitable.

My invention is principally concerned with brush means for washing the front, top and rear surfaces of the vehicle, which comprises a first rotary brush 8 mounted for translation along the tracks 4 and a second rotary brush mounted for translation along the tracks 6. Both these brushes are rotated by any suitable means about axes generally perpendicular to the direction of movement of the vehicle.

The machine also includes rotary brushes for cleaning the sides of the vehicle, these comprising right and left hand brushes 11 sloping upwardly in the direction of travel of the vehicle and right and left hand brushes 12 sloping downwardly in the direction of travel of the vehicle, these brushes being mounted with their axes of rotation generally parallel to the tracks 4 and 6 respectively.

Suitable means according to the state of the art are provided for rotating all the brushes and for supplying water and detergent to them, these not being material to the invention and not being described except as will appear hereinafter.

Considering now the brushes 8 and 10, it will be noted that the brush 8 is shown near the bottom end of the track 4 and brush 10 near the upper end of track 6 which is the condition as the vehicle approaches the entry to the washing machine.

Figure 2:
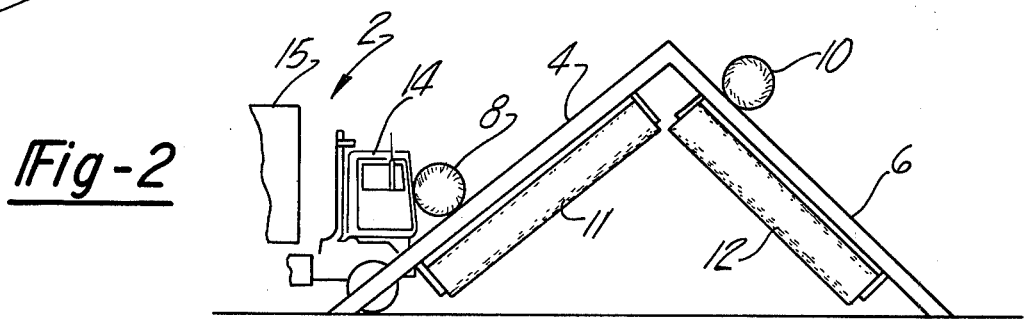
Figure 3:
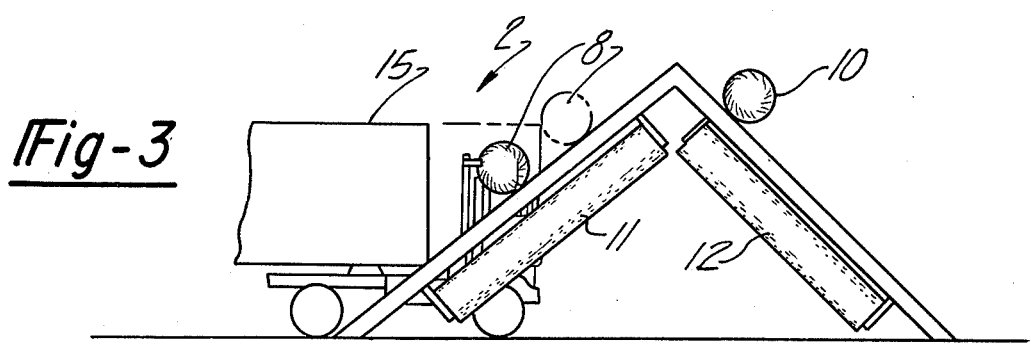

The supply of water and detergent and the energization of the motors to rotate the brushes 8, 10, 11 and 12 may be effected by means responsive to entry of the vehicle into the machine, manually, or otherwise. Brushes 8 and 10 are rotated counterclockwise as viewed in FIGS. 1, 2 and 7. As the vehicle enters the washing machine, as illustrated in FIG. 2, the front face of the tractor engages brush 8 and as the vehicle moves forward it acts to push the brush up tracks 4. Also the counterclockwise rotation of the brush aids in causing the brush to be moved upwardly because of the friction between the downwardly moving surface of the brush and the face of the vehicle cab. As illustrated in FIG. 3, as the vehicle moves progressively through the washing machine the brush 8 is pushed upwardly along tracks 4 until it begins to ride along the upper surface 14 of the tractor, and then upon the upper surface 15 of the trailer. The brush continues to rotate as the vehicle progresses through the machine and remains in contact with the upper surface 15 of the trailer until it is lifted from this surface by means to be described.

Meanwhile, brush 10, which has been held high enough to clear the top of the vehicle, is lowered onto the top by means responsive to movement of the vehicle or, if desired, by action of a washing machine operator. Before the top of the vehicle leaves brush 8, this brush is further elevated up the track by power means to be described and the vehicle proceeds so as ultimately to clear the brush 8 as illustrated in FIG. 5. When the vehicle is in the clear, brush 8 is lowered to its initial lowest position as illustrated in FIG. 5.

Meanwhile, the second brush 10 engages the rear surface of the vehicle. Since this brush is rotating counterclockwise as viewed in FIG. 5 both the weight of the brush and its operating mechanism and the frictional contact with the rear surface 16 tend to cause the brush to move downwardly along the track as illustrated in the sequential views on the right side of FIG. 5. Ultimately, when the vehicle has cleared the washing machine the brush 10 is mechanically raised to its initial position as shown in FIGS. 1 and 2. The machine is then ready for entry of a following vehicle.

As indicated above, the brushes 8 and 10 may be translated along the tracks either by engagement with the vehicle being washed, by gravity, or by power means which effects translation. Since brushes 8 and 10 and the supporting and driving structures for them are relatively heavy, I find it desirable to provide counterweights to reduce the gravitational effect to the desired level—one which creates a preferred level of force between brush and vehicle in accordance with the characteristics of the brushes.

FIG. 6 shows the driving and traversing mechanisms for brush 8 as viewed looking substantially perpendicularly to the tracks 4; that is, downward and somewhat forward in the direction of travel of the vehicle. Brush 8 is fixed to a shaft 18 which is rotated by a motor 19. Motor 19 and a reduction gear 20 are mounted on a generally U-shaped rectangular bracket or frame 22 on which the shaft 18 is rotatably mounted. The shaft 18 is also rotatably mounted within a rubber tired wheel 23 such as an ordinary automobile wheel and tire which rolls on the upper surface of track 4. Reduction gear 20 is connected to shaft 18 through power transmission means such as a chain enclosed in a housing 24. The reaction due to rotation of the brush and also the weight of the motor 19 and the transmission from the motor to the brush shaft is carried by a roller 26 journaled on the frame or bracket 22 and rolling on the upper surface of track 4. The other end of the brush 8 is similarly supported, but there is no driving motor at the other end (although one could be provided).

Power means for moving the brush 8 and supporting assemblies upward along the track includes an electric motor 27 which drives a cross shaft 28 suitably supported on the structure 5. Motor 27 drives shaft 28 through an irreversible reduction gear 30 and an electromagnetically engaged clutch 31. Shaft 28 carries two sprockets 32, each of which drives a chain 34, the lower end of which passes over an idler sprocket 35 journaled in supports 36 mounted on a plate 38 fixed to the track 4. Each chain 34 is fixed to the bracket 22, so that rotation of shaft 28 in one direction hauls the brush 8 upwardly along the track, both ends of the brush being moved equally. The chains 34 and shaft 28 serve to equalize the movements of the two ends of brush shaft 18. Counterweights (not illustrated) may be mounted on chains 34 or coupled to these chains to partially balance the weight of the brushes and their carriages.

With clutch 31 disengaged, brush 8 can translate upwardly or downwardly along the tracks 4 as urged by the vehicle or by the force of gravity. With clutch 31 engaged the irreversible reduction gear 30 serves as a brake to hold the brush in its position; for example, the elevated position where it is clear of the roof of the track as previously mentioned. With the clutch engaged, the motor can drive through the chains 34 to raise the brush to its elevated position. When the brush 8 descends the track under the influence of gravity the wheels 23 engage a stop 39 at the lower end of the track which is biased by a spring or shock absorber 40, the other end of which is fixed to the track 4. This stop serves to arrest movement of the brush 8 without undue abruptness or shock.

Figure 8:
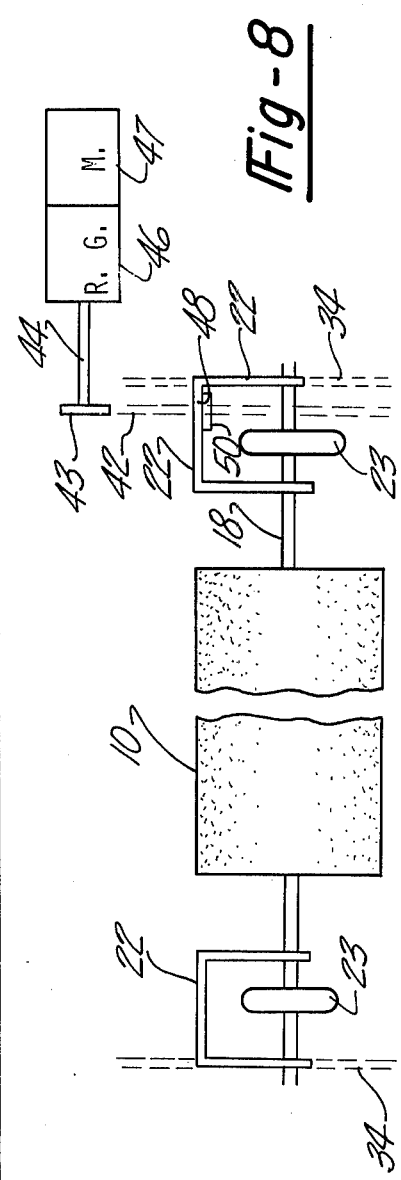
FIG. 8 is a diagrammatic view of the traversing connections to the second brush.

Referring to FIG. 8, the transversing mechanism for the second horizontal shaft bursh 10 is illustrated insofar as it differs from the brush 8. The brush 10 is mounted on a transverse shaft 18 supported by wheels 23 on tracks 6 and driven by means similar to that illustrated in FIG. 6, and therefore not illustrated in FIG. 8. Each bracket 22 is connected to a chain 34 which is run over sprockets at the top and bottom of the track 10 with a cross shaft at one end so as to synchronize the translation of the two ends of shaft 18. In this case, however, the chains 34 are not power driven but are simply a synchronizing means. The means for raising brush 10 upwardly along the tracks comprises a third chain 42 which is driven by a sprocket 43 on a shaft 44 through a reduction gear 46 by a reversible motor 47. The lower end of chain 42 may be run over a idler similarly to chains 34. Chain 42 is coupled to the second brush 10 by a one way connection which, in its preferred embodiment, is simply an arrangement in which chain 42 passes through a hole 48 in the transverse portion of bracket 22. The chain is coupled to the bracket by a block 50 fixed on the chain which bears against the lower side of the bracket 22, and thus carries the brush upwardly. Since the reduction gear 46 is irreversible, brush 10 can be held in the elevated position awaiting entry of the vehicle by engagement of block 50 with bracket 22. When reversible motor 47 is energized to drive the chain so as to lower block 50, the brush 10 can descend under the influence of gravity until it engages the vehicle, and the block 50 can continue to the bottom of track 6. This leaves the brush 10 free to descend in contact with the rear surface of the trailer body as illustrated in FIG. 5. The two ends of the brush 10 are kept at an even elevation by the chains 34 and the cross shaft 28 to which they are connected. This cross shaft may be as illustrated in FIG. 6 except that it is not connected to the reduction gear and driving motor.

Figure 7:
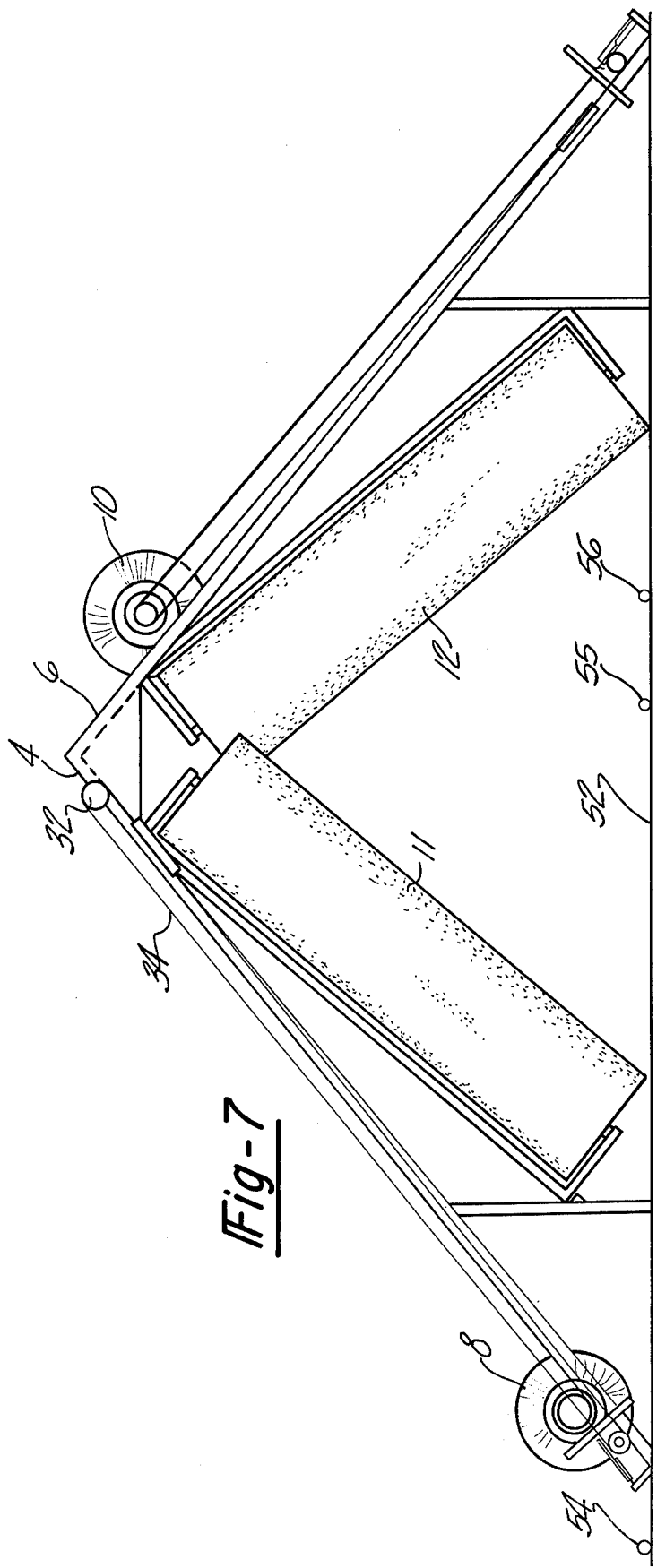
FIG. 7 is a side elevation illustrating a further feature of the invention involving brushes for washing the side of the vehicle.
Figure 9:
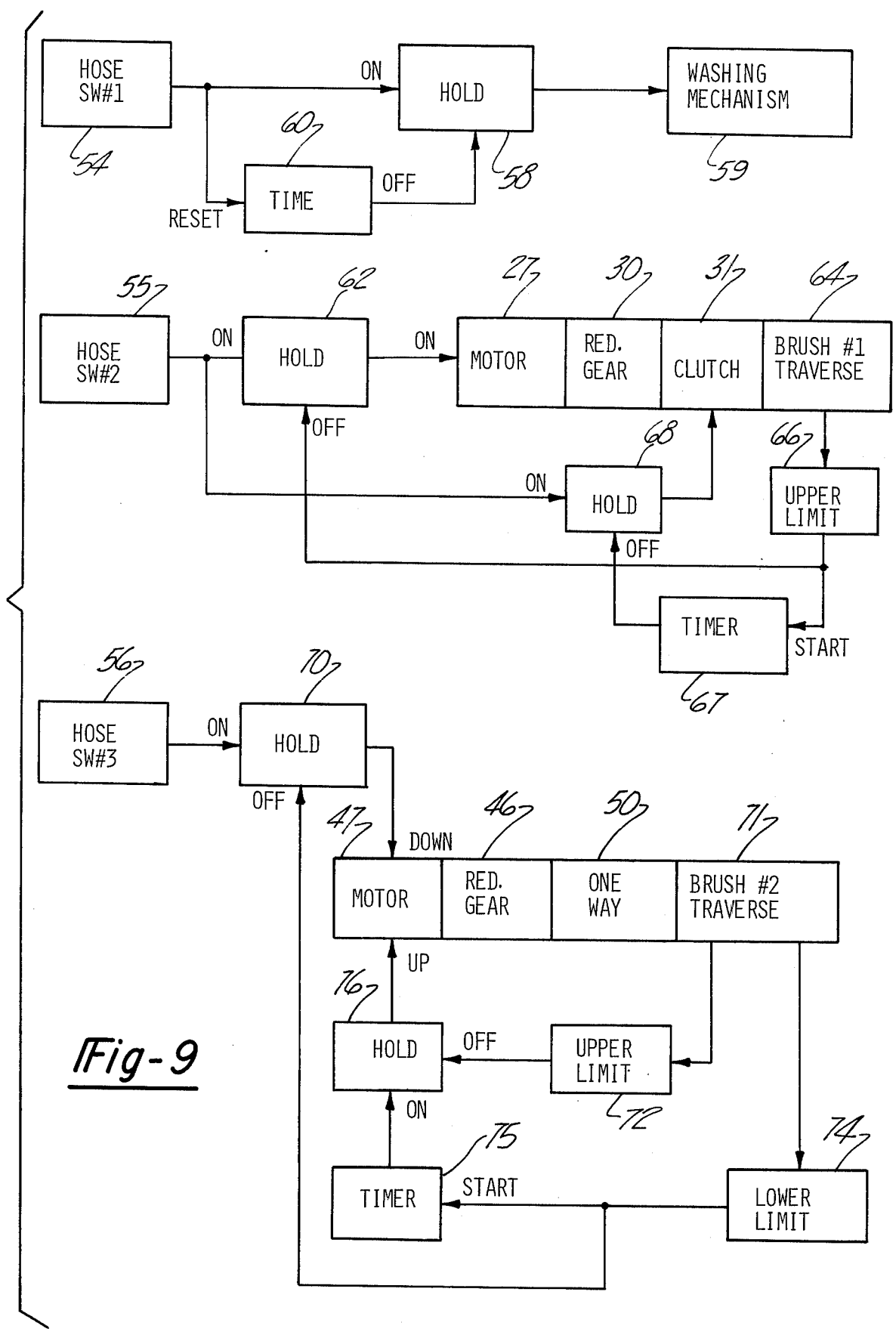
FIG. 9 is a schematic diagram of a control system for the washing apparatus.

This brings us to a control mechanism for the brush traversing motors 27 and 47 which may be described in connection with FIGS. 7 and 9. These controls involve means for determining the entry of the vehicle and its attainment of certain stations on its way through the washing machinery. Preferably these are three hose switches, which are switches of a known type in which a switch is closed by a vehicle passing over a hose laid on the pavement which the vehicle traverses. As illustrated in FIG. 7, the path of the vehicle is identified as 52 and three hose switches are identified as a first switch 54, a second switch 55, and a third switch 56. These are suitably located to operate as desired with a vehicle of the type for which the machine is set up. All of the hose switches are energized from a suitable power source (not illustrated) and energize through suitable control circuits the instrumentalities to be driven which are also energized from the power source. As illustrated in FIG. 9, hose switch 54 (hose switch No. 1) is connected to energize or turn on a holding device 58, which may be a holding relay, which in turn energizes washing mechanism identified as 59 which may include the brush rotating motors and the means for supplying water and detergent to the washing mechanism. Hose switch 54 also resets a timer 60 which allows the holding device 58 to keep the washing mechanism in operation for a given period of time sufficient for a vehicle to pass through the washing machine. After this time interval the timer turns off the holding circuit, as for example, by breaking the holding circuit of a relay. Timer 60 preferably is set to run for sufficient time so as to allow a closely following vehicle to enter the apparatus before shutting down the machinery. In this case, as each vehicle enters the machine, the timer is reset to give the full interval for washing a vehicle before the washing mechanism is shut down. Obviously, the washing mechanism could be turned on and off by an operator operating a switch connected as illustrated for hose switch 54.

With the apparatus thus engerized, as the vehicle proceeds through the washing machine it pushes brush 8 upwardly, washing the front of the vehicle and allowing the brush to rise over the top of the vehicle. At a predetermined point in travel of the vehicle its front wheels engage and close the second hose switch 55 which is so located that it will operate mechanism to lift brush 8 off the vehicle before the trailing end of the vehicle reaches this brush. As the preferred circuits are illustrated schematically in FIG. 9, hose switch No. 2 turns on a holding device 62, which may be a self-holding relay, which in turn energizes the traversing motor 27 for brush 8 to lift the brush to the top of its travel. Motor 27 drives through the reduction gear 30 and electromagnetically engaged clutch 31 to the traversing mechanism for brush 8 which is identified collectively in FIG. 9 as brush No. 1 Traverse 64. The brush traversing mechanism engages an upper limit switch 66 which may be a switch suitably positioned to be engaged by the bracket 22. Limit switch 66 is closed as the brush reaches its upper limit of travel to turn off the holding circuit 62 and thereby de-energize motor 27. Switch 66 also starts a timer 67 which is connected to turn off a holding circuit or device 68. This holding device is initially turned on by hose switch 55 to engage clutch 31 so that the motor can traverse the brush upwardly and so that, when the motor has ceased to operate, the clutch connecting the irreversible reduction gear to the brush holds it in its uppermost position. It will stay in this position until timer 67 times out and turns off the holding circuit, disengaging the clutch. At this time, brush 8 is freed to descend to the lower end of track 4.

This relates to a significant feature of the machine. Because of the rotation of the brush 8 in a clockwise direction as viewed in the figures it tends to pull itself toward the entrance of the washing machine and therefore down tracks 4 by its engagement with the vehicle roof. By lifting the brush from the vehicle before it reaches the rear end any tendency for this pull to project the brush at considerable speed down the track is obviated, and it rolls freely down after clutch 31 is disengaged.

The third hose switch 56 is provided for control of the traversing mechanism for brush 10. This switch energizes a holding device 70 which energizes reversible motor 47 to drive the block 50 in the downward direction. Motor 47 may be reversed by a suitable reversing relay or may be of a type which has windings which are selectively energized for different directions of rotation. The details of the electrical circuitry or the type of motor employed are immaterial to the invention.

Motor 47 drives through reduction gear 46 and the one way drive including block 50 to the traverse mechanism for brush No. 2 identified as 71 in FIG. 9. The carrying structure of brush 10 engages both upper and lower limit switches, identified respectively as 72 and 74. Limit switch 74 may be engaged by block 50, and limit switch 72 by the bracket 22. Lower limit switch 74 energizes a circuit to turn off the holding relay or holding device 70 and thus de-energize the downward driving circuit of motor 47 when block 50 has been moved to its lowermost position to permit full descent of brush 10.

The lower limit switch 74 also starts a timer 75 which turns on a holding device 76 which in turn energizes the upward driving circuit of motor 47. This upward driving circuit raises block 50 and thus carries the brush to its upper limit of travel in preparation for entry of a succeeding vehicle. This action is delayed by timer 75 for a sufficient time for the vehicle being washed to leave the washing machine. When the vehicle has left the washing machine the timer times out and turns on the motor to raise the brush to its position illustrated in FIG. 2. When the brush reaches its upper limit position the upper limit switch turns off the holding circuit 76 and thus de-energizes the motor. The irreversible reduction gear and one way drive hold the brush in this position until the cycle is repeated as described.

It is obvious that other devices for detecting the position of the vehicle such as photoelectric devices or manual means such as direct operator control could be employed instead of the hose switches 1, 2 and 3 as described. Also the timer 75 could be eliminated by substitution of a device which responds to descent of brush 10 to its lower limit as the vehicle leaves as distinguished from the lower limit switch 74 which responds to the position of block 50. Various alternatives to tracks 4 and 6 are possible. For example, brackets 42 could be supported by chains 34. Also springs may be substituted for the counterweights to reduce moving mass.

OPERATION

The preferred mode of operation of the mechanism has been described in connection with the description of the physical structure and control system but may be reviewed briefly for clarity. As the vehicle enters the machine as illustrated in FIG. 1 it closes hose switch 54 to turn on the washing machine such as the brush driving motors and the supply of water and detergent. As the vehicle proceeds, the front end of the cab pushes the brush up, washing the front of the cab and proceeding over the top of the cab. If desired an operator override may be provided to elevate the brush over projections from the top of the vehicle such as an exhaust stack, for example. As the cab of the vehicle passes under the brush 8 the top of the cab is washed and then the brush is pushed upwardly over the front end of the trailer and rides on the top or roof of the trailer. At this time brush 10 is held in its uppermost position through the de-energized motor 47, irreversible reduction gear 46, and the one way drive in which block 50 is engaged with the bracket 22 connected to brush 10.

The front wheels of the vehicle engage hose switch No. 2 as the vehicle proceeds, and brush 8, which has been washing the front part of the top of the vehicle, is raised off the vehicle by energization of motor 27 and clutch 31. It is held clear of the vehicle for sufficient time for the vehicle to run past brush 8, after which the timer 67 allows brush 8 to descend to its lowermost position in preparation for entry of a succeeding vehicle. As the vehicle contacts hose switch No. 3, the motor 47 is energized to allow brush 10 to lower onto the roof of the vehicle ahead of the point where hose switch No. 2 lifted brush 8 off the vehicle so that it continues the washing operation on the top of the vehicle. Then, as the vehicle proceeds further, brush 10 proceeds by gravity down track 6, washing the rear end 16 of the vehicle. At the conclusion of this operation, timer 75 energizes the up circuit of motor 47 to lift brush 10 to its uppermost position, thus completing the working cycle for the particular vehicle.

It may be noted that the side brushes 11 and 12 may be entirely separate from each other. This is illustrated in FIGS. 2 through 5. On the other hand, it may be preferred to have the upper ends of the two brushes intermesh slightly as illustrated in FIG. 7. In this case, they should be counterrotating so that there is no interference between the brushes. In other words, the meshing portions travel in the same direction.

It should be apparent to those skilled in the art from the foregoing detailed description of the preferred embodiment of the invention that I have provided a mechanism for washing large vehicles which is particularly suited to the requirements of practice and which is adapted to closely follow the surfaces of the vehicle being washed and to operate with a minimum of problems either under automatic or semiautomatic control. The simplicity of the structure is one of its principal advantages.

The embodiments of the invention in which an exclusive property or privilege is claimed are defined as follows:

1. A machine for washing the exterior of vehicles comprising, in combination, frame means adapted for relative movement between the frame means and a vehicle in the direction of the length of the vehicle, the frame means comprising first guide means inclined upwardly in the direction of the said relative movement and comprising second guide means inclined downwardly in the direction of the said relative movement; first and second rotary brushes each mounted for rotation about a substantially horizontal axis substantially normal to the said relative direction, the first and second rotary brushes being guided for translation along the first and second guide means, respectively; the first brush being adapted to engage the end of the vehicle which is forward and the second brush the end which is rearward in the direction of said relative movement, and both brushes being adapted to engage the upper surface of the vehicle, the brushes being individually controlled in such translation by engagement with the respective ends of the vehicle; power means for rotating the said brushes about their respective axes, the first brush being rotated in such sense as to be biased upwardly by engagement with the said forward end of the vehicle; first power traverse means coupled to the first brush operable to translate the brush upwardly along its guide means, the said power traverse means being operable to raise the brush from the vehicle; means effective to lower the brush along its guide means after passage of the vehicle; second power traverse means coupled to the second operable to translate the brush upwardly along its guide means and to hold the brush in an elevated position; means responsive to entry of the vehicle into the machine effective to lower the second brush against the top of the vehicle and to free the brush to translate downwardly in contact with the said rearward end of the vehicle; means effective upon completion of the downward translation of the second brush to actuate the second power traverse means to return the second brush to its elevated position and retain it there until freed by entry of a subsequent vehicle into the machine.

2. A machine as described in claim 1 in which the guide means are inclined at about 40° to the direction of the said relative movement.

3. A machine as described in claim 1 including also rotary brush means for washing the sides of the vehicle, the brush means for each side of the vehicle comprising two rotary brushes driven for rotation about axes lying substantially in a generally vertical plane parallel to the said direction of movement, the axes being disposed at about 40° to the horizontal and intersecting, the brushes being counter-rotating and being in mesh at one end of the brushes.

4. A machine for washing the exterior of vehicles comprising, in combination, frame means adapted for relative movement between the frame means and a vehicle in the direction of the length of the vehicle, the frame means comprising guide means inclined upwardly in the direction of the said relative movement; a rotary brush mounted for rotation about a substantially horizontal axis substantially normal to the said relative direction, the said rotary brush being guided for translation along the said guide means; the said brush being adapted to engage the end of the vehicle which is forward in the direction of said relative movement and being adapted to engage the upper surface of the vehicle, the brush being controlled in such translation by engagement with the surface of the vehicle, power means for rotating the said brush about its axis in such sense as to be biased upwardly by engagement with the said forward end of the vehicle; power traverse means coupled to the said brush operable to translate the brush upwardly along its guide means and operable to raise the brush from the vehicle; means effective to lower the brush along its guide means after passage of the vehicle; and means responsive to relative movement of the vehicle and frame means effective to energize the power traverse means to raise the brush from the vehicle while the rearward end of the vehicle passes under the brush and thereafter free the brush for downward movement into a position suitable for engagement with a following vehicle.

5. A machine as described in claim 4 including also shock absorbing means for arresting the downward movement of the brush.

6. A machine for washing the exterior of vehicles having a direction of movement relative to the machine comprising, in combination, first and second rotary brushes each mounted for rotation about a substantially horizontal axis substantially normal to the said relative direction, the first and second rotary brushes being guided for translation along first and second oppositely inclined paths, respectively; the first brush being adapted to engage and be moved upwardly by the end of the vehicle which is forward and the second brush being adapted to engage and move downwardly against the end which is rearward in the direction of said relative movement, and both brushes being adapted to engage the upper surface of the vehicle and being yieldably biased against the respective ends of the vehicle; power means for rotating the said brushes about their respective axes; power traverse means coupled to the first brush operable to raise the brush from the top of the vehicle; and means effective to lower the brush after passage of the vehicle.

7. A machine as recited in claim 6 including also switch means operated by passage of the vehicle to energize the said power traverse means.

8. A machine as recited in claim 6 including also second power traverse means coupled to the second brush operable to translate the brush upwardly and to hold the brush in an elevated position; and means responsive to progress of the vehicle through the machine effective to lower the second brush against the top of the vehicle and to free the brush to translate downwardly in contact with the said rearward end of the vehicle.

9. A machine as recited in claim 8 in which its second power traverse means includes a one-way connection to the second brush.

10. A machine as recited in claim 8 in which the means responsive to progress of the vehicle includes switch means operated by passage of the vehicle.

11. A machine as recited in claim 6 including also second power traverse means coupled to the second brush operable to translate the brush upwardly and to hold the brush in an elevated position; means responsive to progress of the vehicle through the machine effective to lower the second brush against the top of the vehicle and to free the brush to translate downwardly in contact with the said rearward end of the vehicle; and means effective upon completion of the downward translation of the second brush to actuate the second power traverse means to return the second brush to its elevated position and retain it there until freed by entry of a subsequent vehicle into the machine.

* * * * *